Patented Sept. 24, 1935

2,015,094

UNITED STATES PATENT OFFICE 2,015,094

PRODUCTION OF KETONES

James William Woolcock, Mannheim-Kaefertal, Germany, assignor to Imperial Chemical Industries Limited, a corporation of Great Britain No Drawing. Application August 2, 1933, Serial No. 683,320. In Great Britain June 14, 1929

1 Claim. (Cl. 260—134)

This invention relates to the oxidation of secondary alcohols to ketones, and more particularly it pertains to the oxidation of isopropanol to acetone, using a silver catalyst.

One object of the invention comprises a process for oxidizing secondary alcohols to ketones in the presence of water under conditions which assure practical yields of ketone. Another object of the invention comprises the carrying out of this process in the presence of an amount of water approximating that present in the alcohol-water-binary mixture. Other objects will appear hereinafter.

These objects are accomplished by passing a secondary alcohol-water vapor mixture, admixed with the required amount of air over a silver catalyst, the secondary alcohol being oxidized completely to the corresponding ketone, with liberation of a sufficient quantity of heat to maintain the catalyst at the necessary operating temperature.

The following examples which are directed to the oxidation of isopropanol, illustrate the preferred form of the invention.

Example 1

The binary, constant-boiling mixture of isopropanol and water, containing 87.9% by weight of isopropanol, was pumped as a liquid at the rate of 40.3 grams per minute into a steam jacketed vaporizing tube, into which air was simultaneously fed at the rate of 1.26 cubic feet per minute. The mixture of air and isopropanol vapor was then passed through a catalyst mass made up of 100 silver gauze disks, 1.5" in diameter, contained in a copper tube exposed on the outside to the air. Before the gaseous mixture was admitted to the catalyst, gas burners were used to raise the catalyst temperature to about 400° C. The mixture of vapors was then admitted, and the oxidation reaction was allowed to proceed. It was found that the temperature as indicated by the thermocouple held constant at about 550° C.

The thermocouple indicating this temperature was placed in a well situated immediately below the catalyst mass. Most of the reaction takes place on the first 5% of the catalyst. The temperature as shown by the thermocouple must be considerably below that actually existing in the hottest part of the reaction zone.

As the vapors passed through the catalyst, the oxidation of isopropanol to acetone was essentially complete. Practically all of the oxygen was removed from the air. No measurable quantity of by-products was produced, the acetone being obtained in practically quantitative yields.

The vapors from the catalyst tube were passed through a water cooled condenser where most of the water originally present, and that formed by the oxidation, together with a small amount of unchanged isopropanol and some of the acetone, are condensed to a liquid. The uncondensed vapors were passed upward through a wash tower in which water, flowing downward, took out most of the uncondensed acetone. Further recovery of the acetone may be effected by the use of an activated carbon absorber after the wash tower. This was not done on the experimental scale but probably will be done on the plant scale. Fractional distillation of the combined liquid products yielded isopropanol equivalent to about 10% of that fed to the vaporizer, and acetone equivalent to 98% of the isopropanol consumed.

Example 2

This run was made in the same fashion as in Example 1 but at an increased rate. The isopropanol-water binary mixture was fed at the rate of 63.5 grams per minute, and air was passed at the rate of 1.78 cubic feet per minute. The reaction tube glowed with a dull red heat, the temperature indicated by the thermocouple being 656° C. Acetone was obtained in a 99% yield with a conversion of 92%.

Example 3

In this run the rate was increased still further. Isopropanol binary was fed at 81.5 grams per minute and air at 2.5 cubic feet per minute. The tube operated at a red heat, the thermocouple showing 705–710° C. The absorption equipment proved inadequate to recover all of the acetone formed at this high throughput. Again 90% of the alcohol fed was consumed. The actual recovery indicated a yield of 84% of acetone, but undoubtedly uncondensed acetone passed through the system. It was noted that the odor of ketene was quite marked in the exit gases before they were passed through the water scrubber, showing that at the high temperature a certain amount of acetone was decomposed.

Example 4

In this run more water was present in the isopropanol than the amount required to form the theoretical constant boiling mixture. A mixture containing 81.2% by weight of isopropanol and 18.8% water passed at the rate of 45.3 grams per minute to the vaporizer, together with air at the rate of 1.12 cubic feet per minute. The thermocouple indicated a temperature of 527° C. The yield of acetone was 94.1%, and the conversion 86.5%. Calculations showed that the amount of air used was slightly insufficient for complete oxidation of the alcohol. The conversion based on the oxygen in the air used was 97.8%.

In place of isopropanol, other secondary alcohols, for example, secondary butyl alcohol, secondary amyl alcohol, diisopropyl carbinol, and other secondary alcohols obtained by the catalytic synthesis from carbon monoxide and hydrogen may be used, such alcohols containing up to 10 carbon atoms. A substantial amount of water is introduced with the secondary alcohol which is to be oxidized. With isopropanol it is preferred to use the isopropanol-water binary constant-boiling mixture containing 12.0% of water. This alcohol water mixture is very cheaply prepared, and there is a catalytic advantage in the fact that the presence of the water during the catalytic oxidation over silver causes the catalyst to run cleaner. Furthermore, the water scrubs up the acetone as it is condensed in condensers connected with the catalyst tube. The presence of water furthermore tends to even up the temperature in the oxidation zone, by carrying away the heat. The amount of water used may of course vary somewhat below and somewhat above that present in the binary constant-boiling mixture as illustrated in Example 4.

The temperature maintained in the oxidation zone will ordinarily vary between the temperatures at the two extremes of the zone. The hottest portion of the catalyst must not reach the melting point of silver which is 960.5° C. As has been stated, the minimum temperature for the reaction is 500° C. The preferred temperature range is about 550°–700° C.

It is desirable to use an amount of air sufficient to oxidize all of the secondary alcohol which is fed into the reaction zone, and possibly 5% to 10% in excess. If insufficient air is used, unchanged isopropanol will be recovered. Under these conditions the catalyst would separate at a lowered temperature and the equipment at a lowered capacity. If excess air is used above the amount required to oxidize all of the isopropanol the temperature of the reaction is raised due to the oxidation of acetone, with a resulting decrease in yield. The practical limit for the amount of air used would be from 90% to 110% of the theoretical, the preferred range being about 100% to 105%.

The catalyst used in the above examples was an 18 mesh gauze woven from silver wire about 0.013" in diameter. The catalyst however may take any other suitable form such as rolls of silver foil, silver pellets, and the like. The essential feature of the catalyst is that it comprises metallic silver which requires no particular pretreatment to be active as a catalyst.

Through the use of a silver catalyst as described above, it is possible to obtain essentially quantitative yields of acetone, the conversion being 90% or higher in the case of isopropanol for example. The silver catalyst is stable at the high reaction temperatures, since it does not react with oxygen. It is thus superior to a base metal catalyst which by continued oxidation and reduction would be expected to disintegrate more rapidly. It is also superior to metallic oxides in that such oxides require special preparation in order to serve as catalysts, and are therefore more expensive than the silver catalyst, and may not retain their activity as long as silver. The silver can be used in the present process for three months or longer without replacement.

By using isopropanol substantially free from any other organic substance, acetone may be produced substantially pure without a complex rectification process.

The process as outlined operates very smoothly and requires little or no attention other than that required to maintain the feed. Operating costs are therefore very low.

The above description and specific examples are illustrative only and are not to be considered as limiting the scope of the invention. Any variation therefrom which conforms to the spirit of the invention is intended to be included within the scope of the claims.

I claim:

The process which comprises passing an isopropanol-water binary constant-boiling mixture together with air in the proportion of about 63.5 grams of said isopropanol-water mixture to about 1.78 cubic feet of air, through a metallic silver catalyst consisting of a multiple number of pieces of silver gauze at a temperature of about 656° C. and recovering the acetone formed.

JAMES WILLIAM WOOLCOCK.